United States Patent [19]

Hills

[11] Patent Number: 4,718,506

[45] Date of Patent: Jan. 12, 1988

[54] PROM CARD ARRANGEMENT FOR POSTAL/SHIPPING SCALE

[75] Inventor: Karen F. Hills, Norwalk, Conn.

[73] Assignee: Pitney Bowes Inc., Stamford, Conn.

[21] Appl. No.: 33,123

[22] Filed: Mar. 31, 1987

[51] Int. Cl.[4] .................... G01G 23/22; G01G 19/413
[52] U.S. Cl. ........................................ 177/25; 364/567
[58] Field of Search ..................... 177/25.15; 364/567

[56] References Cited

U.S. PATENT DOCUMENTS

| | | | |
|---|---|---|---|
| 3,951,221 | 4/1976 | Rock | 177/25.15 X |
| 4,084,242 | 4/1978 | Conti | 177/25.15 X |
| 4,139,892 | 2/1979 | Gudea et al. | 364/567 |
| 4,325,440 | 4/1982 | Crowley et al. | 177/25.15 |
| 4,481,587 | 11/1984 | Daniels, Jr. | 364/567 X |
| 4,495,581 | 1/1985 | Piccione | 364/567 X |
| 4,638,439 | 1/1987 | Daniels | 177/25.15 X |
| 4,649,490 | 3/1987 | Manduley et al. | 177/25.15 X |

Primary Examiner—George H. Miller, Jr.
Attorney, Agent, or Firm—Gerald E. Linden; David E. Pitchenik; Melvin J. Scolnick

[57] ABSTRACT

Efficient insertion of alternate carrier (AC) PROM boards and drop ship (DS) PROM boards into a limited number of slots in the rate rack of a microprocessor-based weighing scale is achieved by providing a distinguishing characteristic on the PROM board indicative of whether the PROM board is an AC or a DS-PROM board, and by programming the microprocessor to recognize the distinguishing characteristic and to access the proper PROM board in response to keyboard inputs by the scale user. In one embodiment disclosed, the distinguishing characteristic is data at a particular address on a PROM resident on the PROM board. In another embodiment of the invention, the distinguishing characteristic is a physical and/or electrical characteristic of the PROM board itself. Method and apparatus are disclosed.

10 Claims, 7 Drawing Figures

| SLOT NO. | CONFIG. 1 | CONFIG. 2 | CONFIG. 3 (FIG. 5) |
|---|---|---|---|
| 1 | CONTROL | CONTROL | CONTROL |
| 2 | CONTROL | CONTROL | CONTROL |
| 3 | USPS | USPS | USPS |
| 4 | DS | TWO DS | DS OR AC |
| 5 | ZZ | ZZ | ZZ |
| 6 | UPS | UPS | UPS |
| 7 | FOUR AC | FOUR AC | DS OR AC |
| 8 | THREE AC | THREE AC | DS OR AC |
| 9 | DIR | DIR | DIR |

PROM CARD ARRANGEMENT FOR POSTAL/SHIPPING SCALE

TECHNICAL FIELD OF THE INVENTION

The invention relates to the use of interchangeable programmable read-only memory devices (PROMs) in a microprocessor-based postal/shipping weighing scale.

BACKGROUND OF THE INVENTION

Modern postal/shipping scales have the capability of calculating postal and/or shipping charges based on the sensed weight of a parcel or mailpiece and rate information contained on electronic look-up tables resident in the scale. The look-up tables are typically stored within programmable read-only memories and accessed by a microprocessor within the scale.

One type of look-up table that may be stored in a PROM is a "zip-to-zone" (hereinafter, ZZ) table. In the proper mode of operation, an operator would enter via a keyboard, a postal zip code for a shipping destination point, and the scale would automatically determine the shipping zone associated with that zip code. It has been determined that the first three digits of a postal zip code provide sufficient resolution for zip-to-zone conversion. It has also been determined that there need only be on the order of one hundred different look-up tables, each containing subtables related to a group of three digit zips to cover the entire range of possible shipping origination points.

Another type of look-up table that may be stored in a PROM is a "rate" table. A Rate-PROM provides charge-perzone data to the microprocessor. Based on the destination zone, which may be entered either directly by the operator or supplied via the ZZ-PROM, and the data in the Rate-PROM, the microprocessor is able to determine the shipping charge for a parcel. Typically, a Rate-PROM having United Parcel Service (UPS) rate tables and a Rate-PROM having United States Postal Service (USPS) rate tables are used in a scale. Sometimes, the five-digit zip code, rather than the zone only, is required to determine the shipping charge.

A specific type of Rate-PROM is an "alternate carrier" (hereinafter, AC) PROM. An AC-PROM provides the microprocessor with zone charge data for a carrier other than UPS or USPS. Conveniently, the zone structure, but not the charge per zone, is the same for many of these alternate carriers. When it is desired by a shipper to select from a plurality of alternate carriers, a plurality of PROM-based alternate carrier look-up tables would be required.

Sometimes, a shipper may desire to transport a shipment of articles to a point remote from the origination point, and ship from the remote point. Thus, it is convenient to have "drop ship" (hereinafter DS) PROMs resident in the scale and selectable by the user to determine the zip-to-zone conversion based on the remote, drop ship point. A DS-PROM is simply the ZZ-PROM associated with the remote shipping origination point. Having several DS-PROMs resident in the scale would be somewhat consumptive of space.

As an alternative to having a plurality of AC-PROMs and several DS-PROMs resident in the scale, it is known to provide interchangeability for the PROMs. This is typically achieved by providing a connector rack comprising a number of slots in the scale, and by providing the associated PROMs on circuit boards (hereinafter, PROM boards) that plug into the connector rack. As alluded to hereinbefore, size constraints limit the number of slots available in the connector rack. For example, although there may be a total of nine slots in a connector rack, three may be occupied by PROMs programmed for control functions, one by a United States Postal Service Rate-PROM, one by a United Parcel Service Rate-PROM, and one for a shipping origin point ZZ-PROM—leaving only three slots available for AC-PROMs and DS-PROMs.

Due to the data storage capability of modern, inexpensive PROMs, it is quite feasible to provide four distinct alternate carrier rate look-up tables on a single 64 kilobyte (k) PROM. Each rate table for different alternate carriers may be located in a different 16 k portion of a single 64 k AC-PROM. Furthermore, it is possible to provide two AC-PROMs per board. This addresses the problem of providing for a plurality of alternate carrier look up tables on a single AC-PROM board, and it is well known how to access each look-up table individually. However, the benefit of providing several different AC look-up tables on a single PROM board is offset by the complexity involved when a particular carrier, or carriers, changes rates.

Similarly, it would be technically feasible to provide more than one DS look-up table on a single PROM board. Again, for providing access to several DS look-up tables, two DS-PROMs could be provided on each PROM board. This however would create a virtual nightmare in terms of creating and stocking in inventory all of the combinations of possible PROM boards having, for instance, two DS look-up tables. Even with three digit zip code resolution and grouping into approximately only one hundred distinct zip-to-zone look-up tables, nearly five thousand different PROM boards having two DS-look-up tables would be required.

Thus, it is an object of the present invention to provide an efficient technique for user selection of a plurality of AC-PROMs and/or several DS-PROMs, efficient in the sense of keeping to a minimum the number of distinct PROM boards required in inventory, while maintaining ease of customer characterization of the functions within a particular scale.

BRIEF SUMMARY OF THE INVENTION

According to the invention, efficient insertion of alternate carrier (AC) PROM boards and drop ship (DS) PROM boards into a limited number of slots in the rate rack of a microprocessor-based weighing scale is achieved by providing a distinguishing characteristic on the PROM board indicative of whether the PROM board is an AC or a DS-PROM board, and by programming the microprocessor to recognize the distinguishing characteristic and to access the proper PROM board in response to keyboard inputs by the scale user.

According to an aspect of the invention, only one DS zip-to-zone look-up table or AC rate look-up table is contained on each DS or AC PROM board, respectively. A single DS look-up table may be a group of related zip-to-zone subtables.

In one embodiment disclosed, the distinguishing characteristic is data at a particular address on a PROM resident on the PROM board. In another embodiment of the invention, the distinguishing characteristic is a physical and/or electrical characteristic of the PROM board itself.

As used herein, "PROM board" refers to a portable medium for storing machine-readable data.

Other objects, features and advantages of the invention will become apparent in light of the following description thereof.

DETAILED DESCRIPTION OF THE INVENTION

Figure 1:
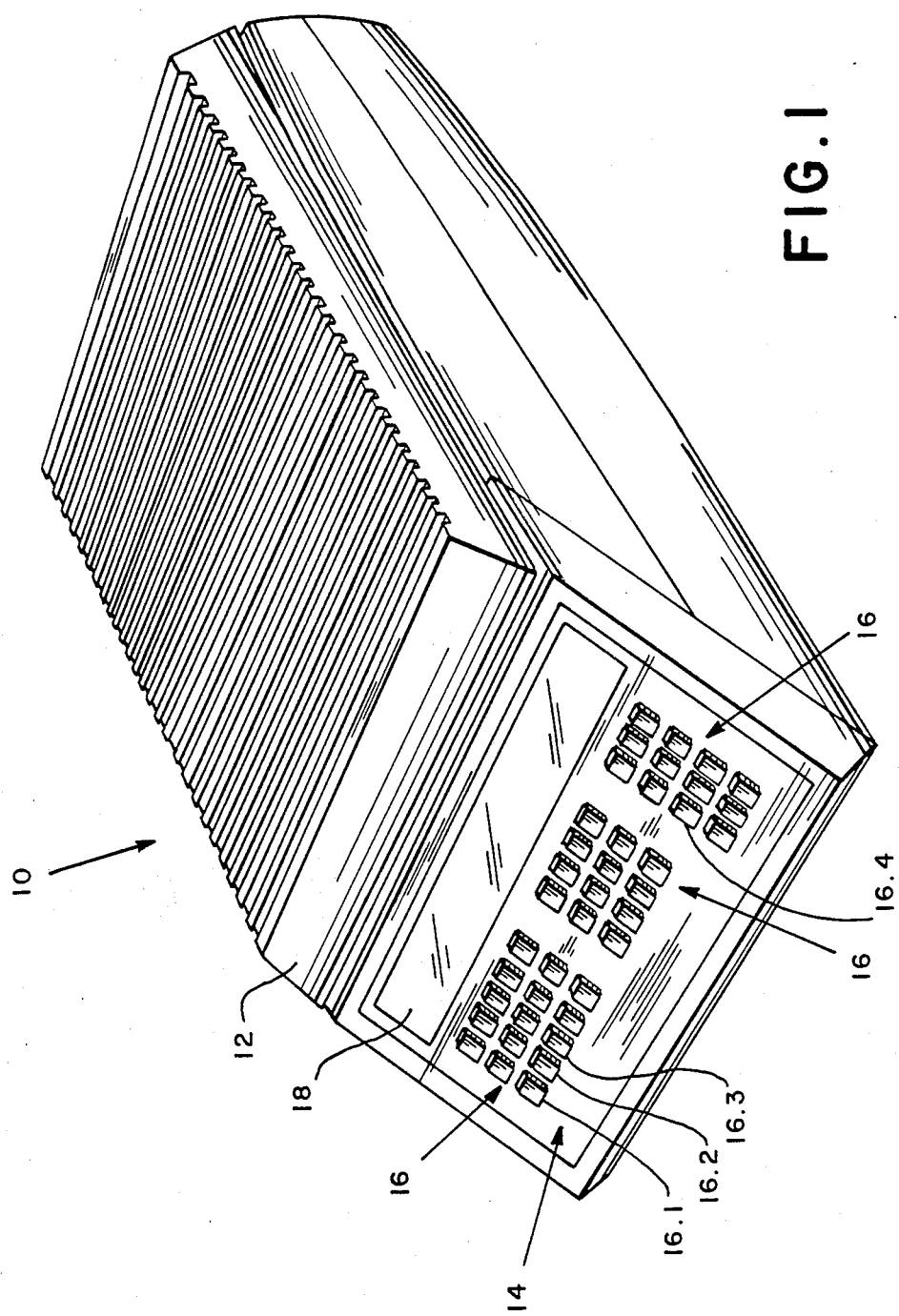
FIG. 1 is a perspective view of a postal/shipping scale for which the invention would be advantageously employed.

FIG. 1 shows a postal/shipping scale 10. The scale has a platform 12 upon which an article such as a package (not shown) is placed for weighing, a keyboard 14 having a plurality of keys 16 through which a user can access the various functions of the scale, and a display panel 18 which displays to the user cues for operating the scale and data related to the weight and shipping-/mailing charge associated with the article being weighed. Three of the keys, 16.1, 16.2 and 16.3 are associated with selecting drop ship points and/or alternate carriers, as is discussed in greater detail hereinafter. Ten of the keys 16.4, are for entering numeric data, such as a zip code or shipping zone.

Figures 2, 3:
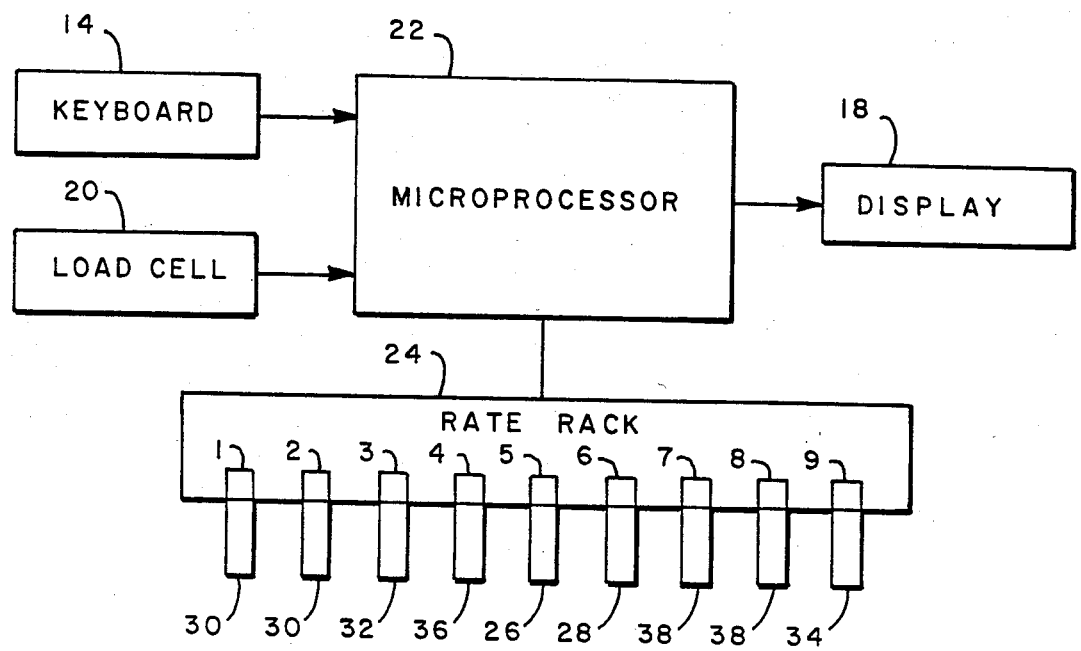
FIG. 2 is a schematic of the hardware of the scale of FIG. 1.
FIG. 3 is a table demonstrative of various solutions to the problem addressed by the invention.

FIG. 2 shows the hardware of the scale 10 of FIG. 1. A load cell 20 provides a signal to a microprocessor 22 indicative of the weight of an article on the scale. The microprocessor is also responsive to signals from the keyboard 14, the various keys 16 of which direct the microprocessor into various modes of operation. The microprocessor outputs signals to the display panel 18 to indicate to the user various operational cues and shipping/mailing charges associated with the weighed article. A rate rack 24 having nine slots numbered 1 through 9 receives PROM boards.

Consider a typical shipping operation. An article is placed on the scale platform 12 for weighing. The display panel 18 displays the weight of the article. The user is prompted to enter, and enters the zip code for the destination of the article. The microprocessor may need to access data to determine the shipping zone for the article and the shipping rate for that zone to determine a total shipping charge for the article. (In some cases, the five-digit zip code or weight may be required.) The shipping zone, or zip-to-zone, information based on the origin shipping point is contained on a zip-to-zone PROM board 26 inserted into the slot 5 of the rate rack 26. The shipping rate information for UPS is contained on a PROM board 28 inserted into the slot 6 of the rate rack. Two PROM boards 30 containing microprocessor control data are inserted into the slots 1 and 2 of the rate rack. A PROM board 32 containing United States Postal Service rates is inserted into the slot 3 of the rate rack. A PROM board 34 containing reference data for the microprocessor is inserted into the slot 9 of the rate rack.

In the event that the user desires to ship from a remote, drop ship point other than the origin shipping point, a DS-PROM board 36 is inserted into the slot 4 of the rate rack, and in the event that the user desires to ship via alternate carriers other than UPS or USPS, two AC-PROM boards 38 are inserted into the slots 7 and 8 of the rate rack. The column A of the table of FIG. 3 is representative of the aforementioned arrangement (Config. 1).

As indicated in column A of the table of FIG. 3, it is possible to have the rate information for more than one of alternate carriers resident on a single AC-PROM board (i.e., four alternate carrier rates on the AC-PROM board inserted in the slot 7 and three on the AC-PROM board inserted in the slot 8).

An alternate configuration (Config. 2) of PROM boards is shown in column B of the table of FIG. 3. Therein, a PROM board containing zip-to-zone data for two drop ship points is inserted into the slot 4. All of the other slots 1–3 and 5–9 have PROM boards inserted therein in the manner discussed with respect to column A of the table.

As discussed hereinbefore, having data for more than one drop ship point resident on a PROM-card creates an unmanageable number of distinct DS-PROM cards. Similarly, having data for more than one rate table on an AC-PROM card creates the possibility of many distinct AC-PROM cards.

With reference to column C of the table of FIG. 3, the underlying technique of the present invention is poignantly illustrated. The slots 1, 2, 3, 5, 6 and 9 receive their respective control, USPS, origin zip-to-zone, UPS, and directory PROM cards, as discussed with respect to the configurations of columns A and B. The slots 4, 7 and 8 receive either a DS or an AC-PROM card, each carrying only one look up table with zip-to-zone or rate data, respectively. This allows the user to select from up to three drop ship points, up to three alternate carriers, or any combination thereof totalling three.

Figures 4, 5:
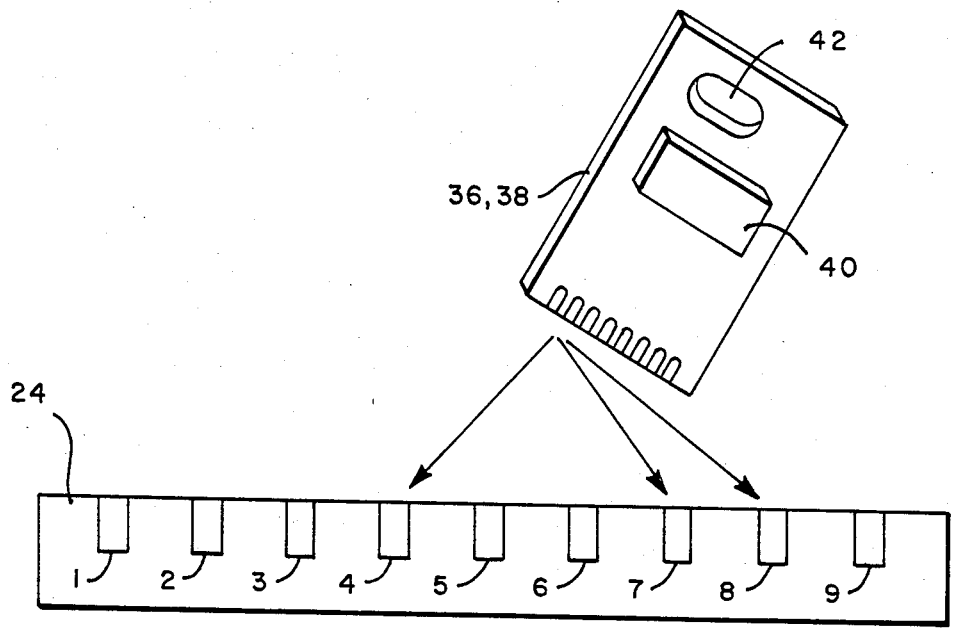
FIG. 4 is a representation of a rate rack arrangement having a number of slots for receiving PROM boards, such as would be employed in the scale of FIG. 1.
FIG. 5 is tables demonstrating the underlying versatility of the invention.

FIG. 4 illustrates the concept that the DS-PROM boards 36 and the AC-PROM boards 38 are capable of insertion into any of the slots 4, 7 or 8, i.e., they physically resemble each other. It is also illustrated that only one PROM 40 is required for either of these PROM boards. A hole 42 is provided in the trailing edge of the PROM board to facilitate its removal from the rate rack.

FIG. 5 shows a table 100 illustrative of all eight possible combinations by which three DS-PROM cards and three AC-PROM cards could be inserted into the slots 4, 7 and 8, as indicated in FIG. 4. In the column A thereof, slots 4, 7 and 8 are each occupied by a DS-PROM card. In the column B thereof, slots 4 and 7 are occupied by a DS PROM card, and slot 8 is occupied by an AC-PROM card. In the column C thereof, slot 4 is occupied by a DS PROM card, slot 7 is occupied by an AC PROM card and slot 8 is occupied by a DS PROM card. In the column D thereof, the slot 4 is occupied by an AC PROM card and the slots 7 and 8 are occupied by DS PROM cards. In the column E thereof, the slot 4 is occupied by a DS PROM card and the slots 7 and 8 are occupied by AC PROM cards. In the column F thereof, the slots 4 and 8 are occupied by AC PROM cards and the slot 7 is occupied by a DS PROM card. In the column G thereof, the slots 4 and 7 are occupied by AC PROM cards and the slot 8 is occupied by a DS PROM card. In the column H thereof, the slots 4, 7 and 8 are occupied by AC PROM cards.

If the scale user desires, for example, up to three drop ship points, up to three alternate carriers, or any combination thereof totalling three, accessible via the scale, he is able to access each one individually by pressing an associated key 16.1, 16.2 or 16.3 on the keyboard (of FIG. 1). To this end, and for other reasons, it is preferable to instruct the user to insert the various DS and/or AC-PROM cards into the slots 4, 7 and 8 in an orderly manner. The Table 200 of FIG. 5 is essentially a subset of the table 100, four of the eight combinations presented therein having been selected as representative of an "orderly manner" by which the DS and/or AC-PROM cards should be inserted into the slots 4, 7 and 8. In the column I thereof (corresponding to the column A of the Table 100), a DS-PROM card for a first drop ship point, DS1, is inserted into the slot 4, a DS-PROM card for a second drop ship point, DS2, is inserted into the slot 7, and a DS PROM card for a third drop ship point, DS3, is inserted into the slot 8. In the column II thereof, (corresponding to the column B of the Table 100), a DS-PROM card for a first drop ship point, DS1, is inserted into the slot 4, a DS PROM card for the second drop ship point, DS2, is inserted into the slot 7, and an AC PROM card for a first alternate carrier, AC1 is inserted into the slot 8. In the column III thereof (corresponding to the column E of the Table 100), a DS PROM card for a first drop ship point, DS1, is inserted into the slot 4, an AC PROM card is a first alternate carrier, AC1, is inserted into the slot 7, and an AC PROM card for a second alternate carrier, AC2, is inserted into the slot 8. In the column IV thereof (corresponding to the column H of the Table 100), an AC PROM card for a first alternate carrier, AC1, is inserted into the slot 4, an AC PROM card for a second alternate carrier, AC2, is inserted into the slot 7, and an AC PROM card for a third alternate carrier, AC3, is inserted into the slot 8.

By so ordering the insertion of the DS and AC-PROM cards in the slots 4, 7 and 8, the Table 200, when stored on the directory PROM, becomes useful for microprocessor determination of keystroke (e.g., 16.2) to slot (e.g., slot 7) conversion, as is discussed hereinafter.

Figure 6:
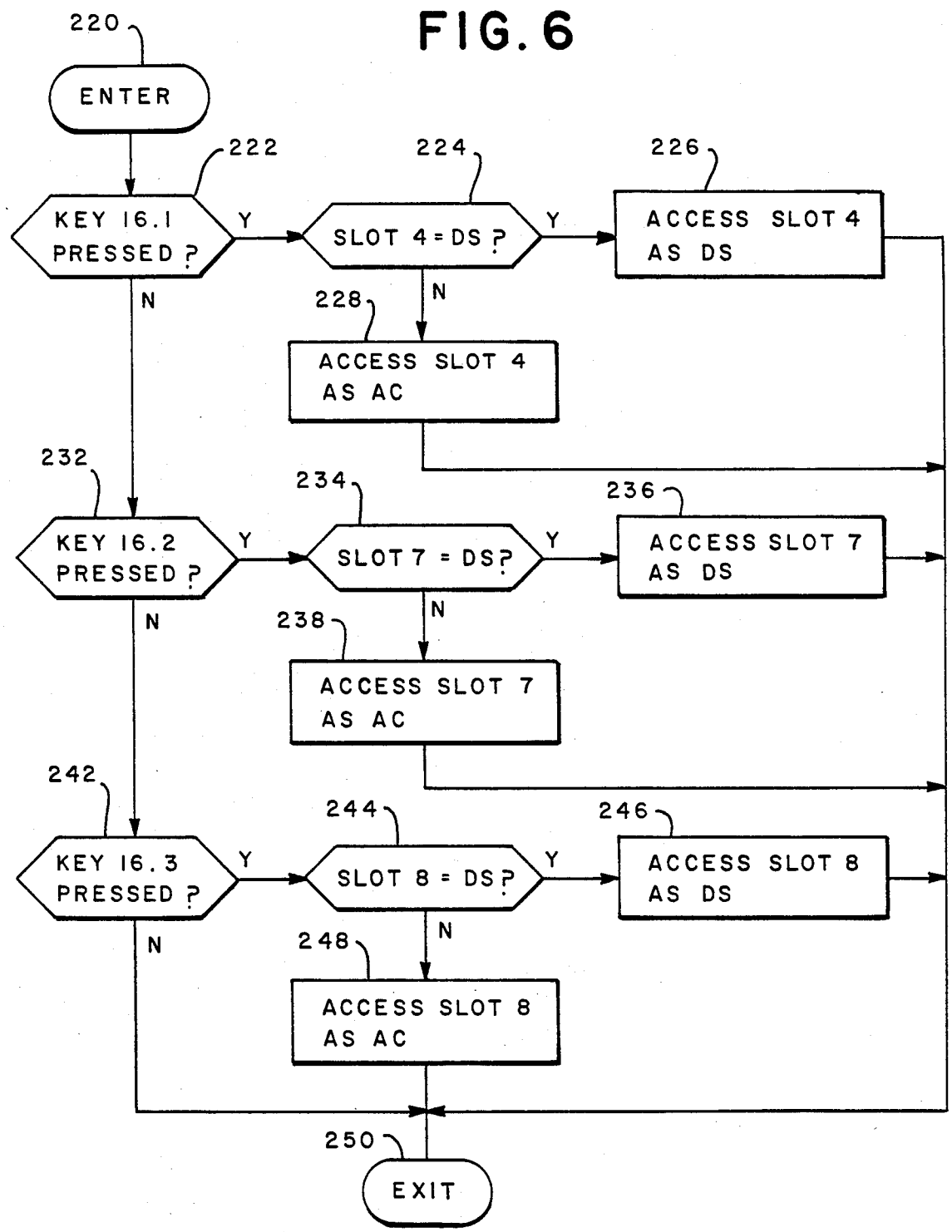
FIG. 6 is a flow chart of an embodiment of the invention.

The flow chart of FIG. 6 is illustrative of how the microprocessor (22 of FIG. 2) could be programmed with a routine to access the appropriate PROM-board DS or AC lookup table in the slot 4, 7 or 8 in response to a keystroke. The routine is accessed via a step 220.

In a step 222, it is determined whether the key 16.1 (of FIG. 1) has been pressed. If so, and assuming that there is a PROM board in the slot, it is determined in a step 224 whether the PROM board in the slot 4 is a DS-PROM board, based on a distinguishing characteristic. If the PROM board in the slot 4 is a DS-PROM board, it is accessed in a step 226 as such, else it is accessed in a step 228 as an AC-PROM board.

If the result of the step 222 is negative, in a step 232 it is determined whether the key 16.2 (of FIG. 1) has been pressed. If so, it is determined in a step 234 whether the PROM board in the slot 7 is a DS-PROM board, based on its distinguishing characteristic. If the PROM board in the slot 7 is a DS-PROM board, it is accessed in a step 236 as such, else it is accessed in a step 238 as an AC PROM board.

If the result of the step 232 is negative, in a step 242 it is determined whether the key 16.3 (of FIG. 1) has been pressed. If so, it is determined in a step 244 whether the PROM board in the slot 8 is a DS-PROM board, based on its distinguishing characteristic. If the PROM board in the slot 8 is DS PROM board, it is accessed in a step 246 as such, else it is accessed in a step 248 as an AC PROM board. The routine is exited at a step 250.

As described with respect to FIG. 6, there is a one-to-one correspondence between the three keys 16.1, 16.2, 16.3 and the three slots 4, 7, 8.

The distinguishing characteristic determining whether a PROM board is a DS or an AC PROM board is conveniently data contained at a specific address on a PROM on that board. However, it could be a physical or electrical characteristic of the board itself, such as a notch or a contact that is detectable via a switch or contact associated with the connector slot in the rate rack.

Figure 7:
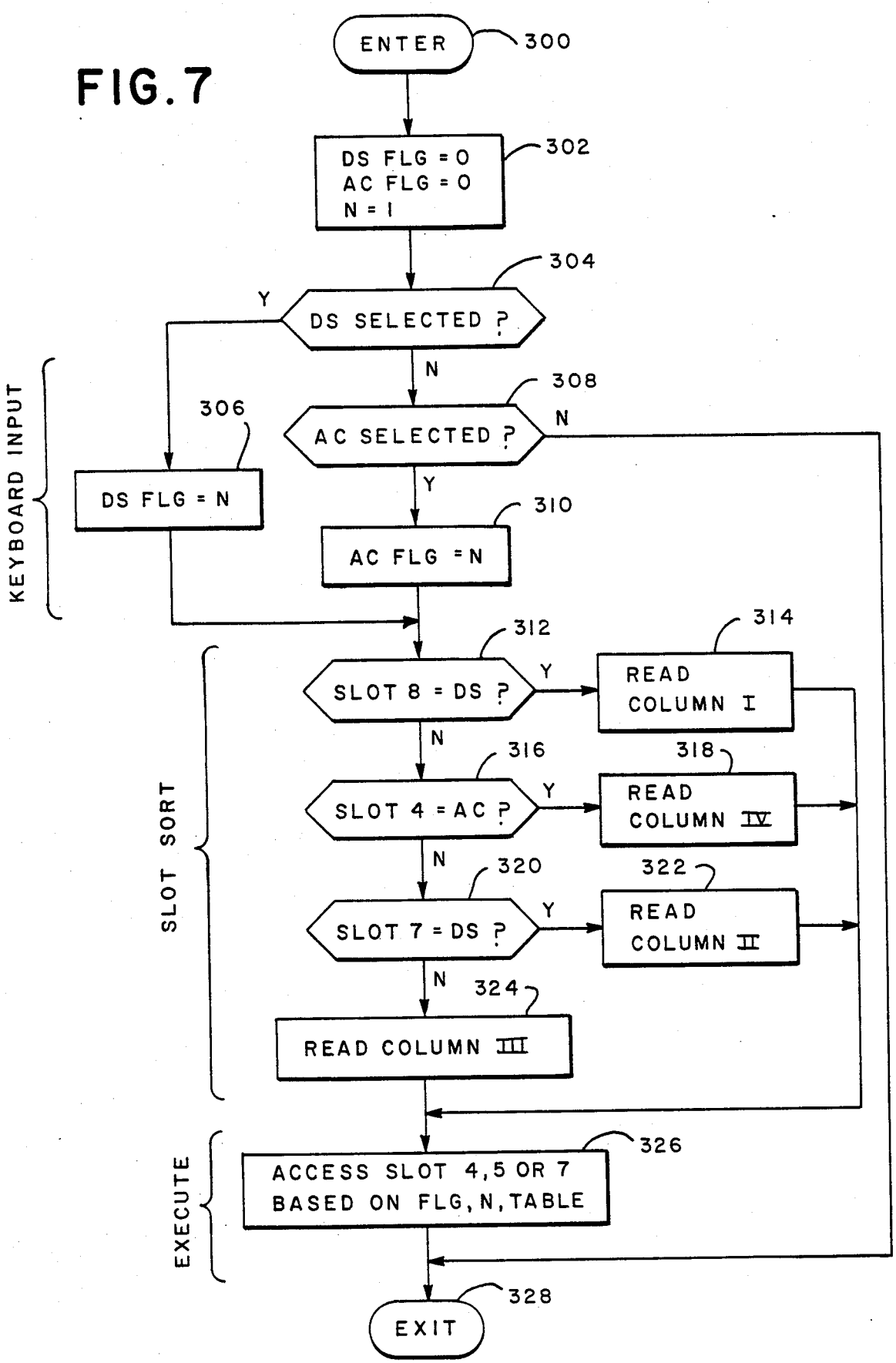
FIG. 7 is a flow chart of an alternate embodiment of the invention.

The flow chart of FIG. 7 is illustrative of an alternate embodiment of the invention wherein one of the two keys 16 (of FIG. 1) is depressed to select either the drop ship or alternate carrier feature, and a numeric key 16.4 is pressed to designate which drop ship point or alternate carrier is desired, such as a second drop ship point, DS2, or a third alternate carrier, AC3.

The routine of FIG. 7 is entered at a step 300. In a step 302 two flags, DSFLG and ACFLG, are initialized by setting them to zero, and a variable, N, is set to a default value of one.

Next, in a step 304 it is determined whether the drop ship function has been selected by the user via the keyboard (14 of FIG. 1). If so, in a step 306 the DSFLG is set to the default value (one) for N if no number has been input by the user in conjunction with his selection of DS - else the DSFLG is set to the input number N (i.e., to 1 for DS1, to 2 for DS2, and to 3 for DS3).

If the result of the step 304 is negative, in a step 308 it is determined whether the alternate carrier function has been selected by the user via the keyboard. If so, in a step 310 the ACFLG to the default value (one) for N if no number has been input by the user in conjunction with his selection of AC - else the ACFLG is set to the input number N (i.e., to 1 for AC1, to 2 for AC2, and 3 for AC3).

The steps 304 through 310 represent the keyboard reading section of the program. The following steps 312 through 324 represent the slot sorting section of the program.

In the step 312 it is determined whether a DS-PROM board is resident in slot 8 of the rate rack. This may be performed, as mentioned hereinbefore by the microprocessor reading a particular memory address on the PROM board indicative of whether the PROM board is a DS or an AC-PROM board. If the PROM board, if any, resident in slot 8 is a DS-PROM board, in a step 314 the microprocessor is loaded with (or caused to read) the keystroke-to-slot conversion data of column I of the Table 200 of FIG. 6 (resident in the Directory PROM).

If the PROM board in slot 8 is not a DS-PROM board, it is determined in a step 316 whether an AC-PROM board is resident in slot 4. If so, in a step 318 the microprocessor is loaded with the keystroke-to-slot conversion data of column IV of the Table 200.

If the PROM board in the slot 8 is not an AC-PROM board, it is determined in a step 320 whether a DS- PROM board is resident in slot 7. If so, in a step 322 the microprocessor is loaded with the keystroke-to-slot conversion data of column II of the Table 200. If not, it is loaded with the keystroke-to-slot conversion data of column III of the Table 200 in the step 324.

Once the proper keystroke-to-slot conversion data has been obtained by the microprocessor (step 314, 318, 322 or 324), in a step 326 the proper slot is accessed (execute) for its resident PROM card look-up table. This result has been obtained, as explained, based on which flag (DSFLG or ACFLG) has been set in response to a user keystroke, its value (N) as determined by a keystroke or N's default value, and the appropriate keystroke-to-slot conversion data from the Table 200. The routine is exited at a step 328.

It should be understood that the data-based characterizing of a PROM card, as discussed, is not the only means by which a PROM card could be identified as either a DS-PROM card or an AC-PROM card. For instance, a physical indication, such as a notch or a contact on the PROM card itself, could be employed to provide the indication discussed with regard to the steps 312, 316 and 320 of FIG. 7.

It should also be understood that the aforementioned concept of providing only a single look-up table for each DS or AC-PROM board, although preferable for resons discussed, is not absolutely necessary to the practice of this invention. Providing two or more look-up tables on a single PROM board is technically feasible, but creates problems in the number of distinct PROM boards as a result of the number of mathematical combinations created thereby.

What is claimed is:

1. In combination with a scale having:
    means for sensing the weight of an article;
    a rate rack having slots for electrically and physically receiving PROM boards; and
    calculating means, responsive to look-up tables on PROM boards inserted into the slots, for calculating a shipping charge for the article based on the sensed weight of the article, a selected destination zip code or shipping zone for the article, a selected carrier for the article, and a selected shipping point for the article;
    apparatus for providing a selection of shipping point look-up tables and carrier look-up tables to the calculating means comprising:
    a number of PROM boards, each containing a look-up table indicative of zip-to-zone conversion for a remote drop ship point, and each having a distinguishing characteristic identifying the PROM board as a DS-PROM board; and
    a number of PROM boards, each containing a look-up table indicative of shipping rates for an alternate carrier, and each having a distinguishing characteristic identifying the PROM board as an AC-PROM board.
    means, associated with the calculating means, for determining whether a PROM board inserted into a particular slot is a DS-PROM board or an AC-PROM board based on the distinguishing characteristic of the PROM board inserted into the slot, and for providing an indication of the determination to the calculating means.

2. Apparatus according to claim 1, wherein each of the DS or AC-PROM boards contains only a single look-up table.

3. Apparatus according to claim 1, wherein the distinguishing characteristic is data contained on the respective AC-PROM boards and DS-PROM boards.

4. Apparatus according to claim 1, wherein the distinguishing characteristic is a physical or electrical feature of the PROM board.

5. Apparatus according to claim 1 wherein:
    a number, n, of the slots are for receiving either a DS-PROM board or an AC-PROM board;
    there are a number, x, of DS-PROM boards insertable into the n slots;
    there are a number, y, of AC-PROM boards insertable into the n slots; and
    both x and y are greater than n.

6. Apparatus according to claim 1, wherein:
    a number, n, of the slots are for receiving either a DS-PROM board or an AC-PROM board; and
    up to a total number of n DS-PROM boards or AC-PROM boards are actually inserted into the n slots.

7. Apparatus according to claim 6, further comprising:
    key means for selecting up to a total of n alternate carriers and/or drop ship points.

8. Apparatus according to claim 7, wherein there are n key means and a one-to-one correspondence between the key means and the slots.

9. Apparatus according to claim 1, further comprising:
    means for defining a protocol by which DS-PROM boards and AC-PROM boards are inserted into the number, n, of slots.

10. In a scale having:
    means for sensing the weight of an article;
    a rate rack having slots for electrically and physically receiving PROM boards; and
    calculating means, responsive to look-up tables on PROM boards inserted into the slots, for calculating a shipping charge for the article based on the sensed weight of the article, the selected destination zip code or shipping zone for the article, the selected carrier for the article, and the selected shipping point for the article;
    a method of providing for a selection of alternate carrier look-up tables and drop ship point look-up tables accessible to the calculating means, comprising:
    providing a number of PROM boards, each having a look-up table indicative of shipping rates for an alternate carrier, and each having a distinguishing characteristic identifying the PROM board as an AC-PROM board;
    providing a number of PROM boards, each having a look-up table indicative of zip-to-zone conversion for a remote drop ship point, and each having a distinguishing characteristic identifying the PROM board as a DS-PROM board;
    determining whether a PROM board inserted into a particular slot is a DS-PROM board or an AC-PROM board based on the respective distinguishing characteristic; and
    providing an indication of the determination to the calculating means.

* * * * *